(12) United States Patent
Corcos et al.

(10) Patent No.: US 9,857,231 B2
(45) Date of Patent: Jan. 2, 2018

(54) SENSORS FOR DETECTING INCIDENT SIGNALS HAVING DISTURBANCE ELEMENTS

(71) Applicant: International Business Machines Corporation, Armonk, NY (US)

(72) Inventors: Dan Corcos, Tel Aviv (IL); Danny Elad, Moshav Liman (IL); Bernd W. Gotsmann, Horgen (CH); Thomas E. Morf, Gross (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 333 days.

(21) Appl. No.: 14/953,707

(22) Filed: Nov. 30, 2015

(65) Prior Publication Data
US 2017/0199082 A1    Jul. 13, 2017

(51) Int. Cl.
  *A61B 5/00*    (2006.01)
  *G01J 5/20*    (2006.01)
  *H04B 17/10*    (2015.01)
  *H01Q 1/20*    (2006.01)

(52) U.S. Cl.
  CPC .............. *G01J 5/20* (2013.01); *H01Q 1/20* (2013.01); *H04B 17/102* (2015.01)

(58) Field of Classification Search
  None
  See application file for complete search history.

(56) References Cited

U.S. PATENT DOCUMENTS

| 8,094,023 | B1 | 1/2012 | El-Kady et al. | |
| 8,508,370 | B1 | 8/2013 | El-Kady et al. | |
| 2008/0237469 | A1* | 10/2008 | Oda | G01J 5/02 250/339.02 |
| 2012/0091342 | A1* | 4/2012 | Berger | G01J 5/0837 250/338.4 |
| 2012/0097204 | A1 | 4/2012 | Yu et al. | |
| 2012/0273963 | A1* | 11/2012 | Mirsky | H01L 23/3735 257/774 |
| 2013/0082181 | A1* | 4/2013 | Corcos | G01J 5/34 250/349 |
| 2013/0142215 | A1* | 6/2013 | Nemirovsky | G01J 5/02 374/121 |

(Continued)

OTHER PUBLICATIONS

D. Song, et al.,"Thermal Conductivity of Periodically Microporous Silicon Membranes", IEEE, International Conference on Thermoelectronics, 2002, p. 1-4.

(Continued)

*Primary Examiner* — Andre Allen
(74) *Attorney, Agent, or Firm* — Cantor Colburn LLP; David Quinn

(57) ABSTRACT

A sensor and method of making a sensor for detecting an incident signal is provided. The sensor includes a frame, an antenna and a platform configured to detect the incident signal, and a holding arm connected to the frame, the holding arm configured to structurally support the antenna and the platform, and further configured to operably connect the platform to an electronic device external to the frame. The holding arm includes a conductor having an axial length and a plurality of disturbance elements formed along the axial length of the conductor.

18 Claims, 10 Drawing Sheets

(56) References Cited

U.S. PATENT DOCUMENTS

2013/0255738 A1   10/2013   Mitrovic et al.
2015/0241281 A1*   8/2015   Corcos ..................... G01J 5/04
                                                                                                  250/349

OTHER PUBLICATIONS

D. Song, et al., "Thermal conductivity of periodic microporous silicon films", Applied Physics Letters, vol. 84, Issue 687, No. 5, Feb. 2, 2004, pp. 1-4.
J.-Kan Yu, et al., "Reduction of thermal conductivity in phononic nanomesh structures", Nature Nanotechonology, vol. 5, Jul. 25, 2010, p. 1-4.
M. Asheghi, et al., "Phonon-boundary scattering in thin silicon layers", Research Gate, Jul. 29, 1997, p. 1-4.
M. Asheghi, et al., "Temperature-Dependent Thermal Conductivity of Single-Crystal Silicon Layers in SOI Substrates", ASME Digital Collection, vol. 120, Issue 1, Jan. 7, 2008, pp. 1-4.
N. Zen, et al., "Engineering thermal conductance using a two-dimensional phononic crystal", Nature Communications, vol. 5, article 3435, Mar. 19, 2014, p. 1-50.
P. E. Hopkins, et al., "Reduction in the Thermal Conductivity of Single Crystalline Silicon by Phononic Crystal Patterning", NANO Letters, American Chemical Society, Aug. 17, 2010, p. 1-6.
W. Liu, et al., "Phonon—boundary scattering in ultrathin single-crystal silicon layers", Applied Physics Leters, vol. 84, No. 19, May 10, 2004, p. 1-4.

* cited by examiner

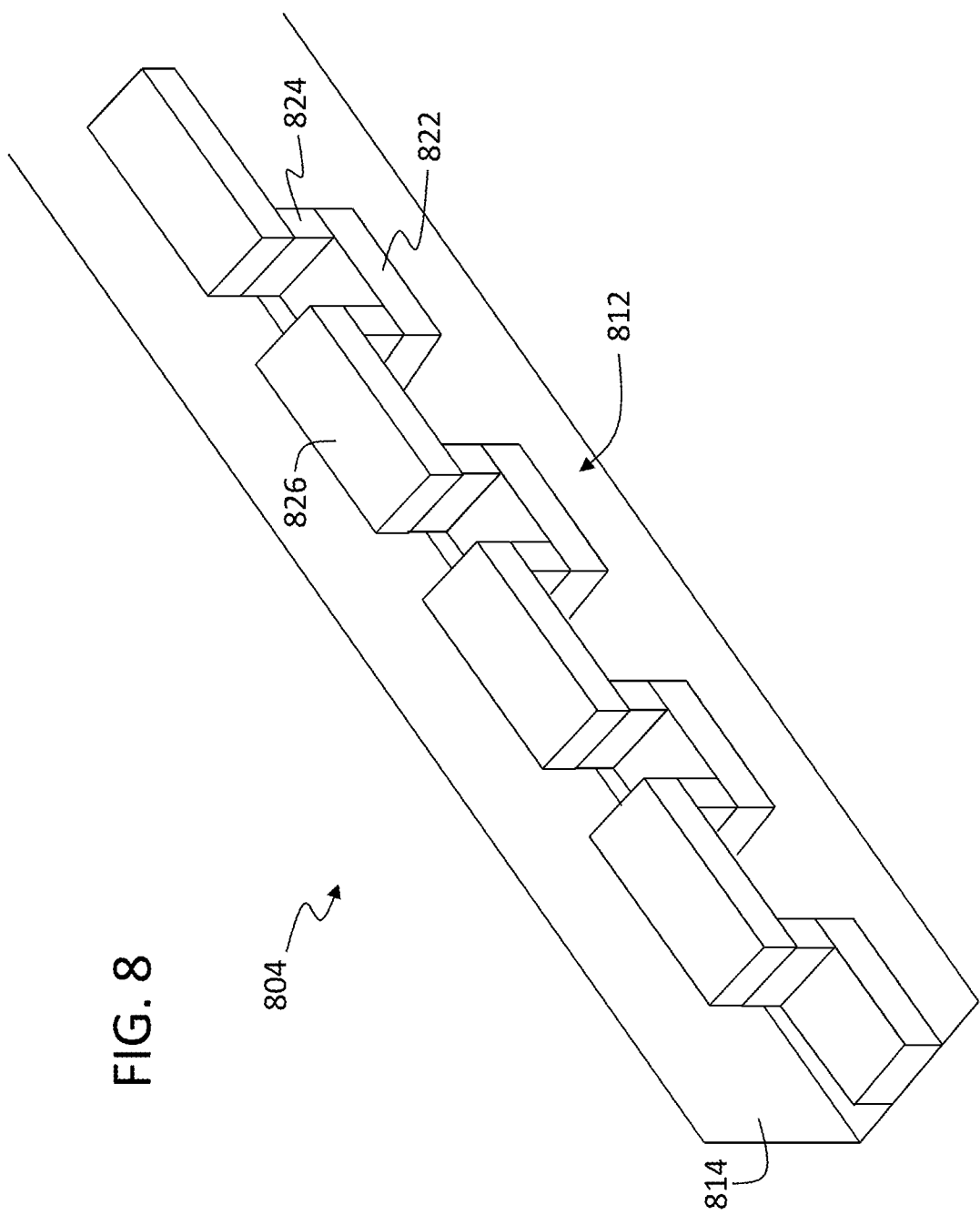

SENSORS FOR DETECTING INCIDENT SIGNALS HAVING DISTURBANCE ELEMENTS

BACKGROUND

The present disclosure relates generally to sensors and methods of making sensors and, more specifically, to sensors having disturbance elements and features for improving thermal, electrical, and/or mechanical properties of the sensors.

Thermal and electrical conductivity are strongly connected. In many applications a low electrical resistance and a high thermal resistance is desired but may be difficult to achieve. In addition, mechanical stability and high thermal resistance are contradicting requirements. Optimizing all three properties may be difficult as improving one property may negatively impact one of the other properties. Sensors may be implemented as microelectromechanical systems ("MEMS") devices and may be configured to rely on a simple-to-implement temperature measurement. One example of this type of sensor may be a bolometer.

A bolometer is a device for measuring the power of incident electromagnetic radiation via the heating of a material and measuring the resulting temperature change. A bolometer contains a temperature sensing device, e.g. a diode, a resistor with a high-temperature coefficient, or a resistor implemented in a high-temperature superconductor cooled to a critical temperature all on a thermally insulated platform. Wires may be configured to connect the platform to associated readout electronics. The wires may be configured with a low electrical resistance and a high thermal resistance, so as to not reduce the sensitivity of the sensor. This is because the signal of the sensor is a temperature change, and thus it is advantageous to prevent thermal losses when transmitting thermal information along the wires.

The wires may also be configured as holding arms for mechanically or structurally supporting the sensor elements. The holding arms may be configured with mechanical stability to support the sensor.

SUMMARY

A sensor and method of making a sensor for detecting an incident signal is provided. The sensor includes a frame, an antenna and a platform configured to detect the incident signal, and a holding arm connected to the frame, the holding arm configured to structurally support the antenna and the platform, and further configured to operationally connect the platform to an electronic device external to the frame. The holding arm includes a conductor having an axial length and a plurality of disturbance elements formed thereon along the axial length of the conductor.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 8 is a perspective schematic illustration of a holding arm in accordance with another embodiment of the present disclosure;

DETAILED DESCRIPTION

Embodiments described herein are directed to sensors, such as bolometers, having simultaneous optimization of thermal and electrical resistance and mechanical properties. In accordance with some embodiments provided herein, holding arms of bolometer sensors are configured with materials and/or structures configured to optimize thermal and electrical resistance properties within the sensor while also optimizing mechanical and/or structural properties and the integrity thereof.

A bolometer is a device or sensor for measuring the power of an incident electromagnetic radiation or signal via the heating of a material of the sensor and measuring the resulting temperature change within the sensor. A bolometer contains a temperature sensing device, e.g., a diode, a resistor with a high-temperature coefficient, or a resistor implemented in a high-temperature superconductor cooled to a critical temperature all on a thermally insulated platform. Wires or holding arms may be configured to connect the platform to readout electronics of the sensor. The holding arms may have a low electrical resistance and simultaneously have a high thermal resistance, such as not to reduce the sensitivity of the sensor, because the signal to be read is a temperature change. The holding arms also include or may be configured to provide sufficient mechanical stability to support the sensor or components thereof.

Figure 1:
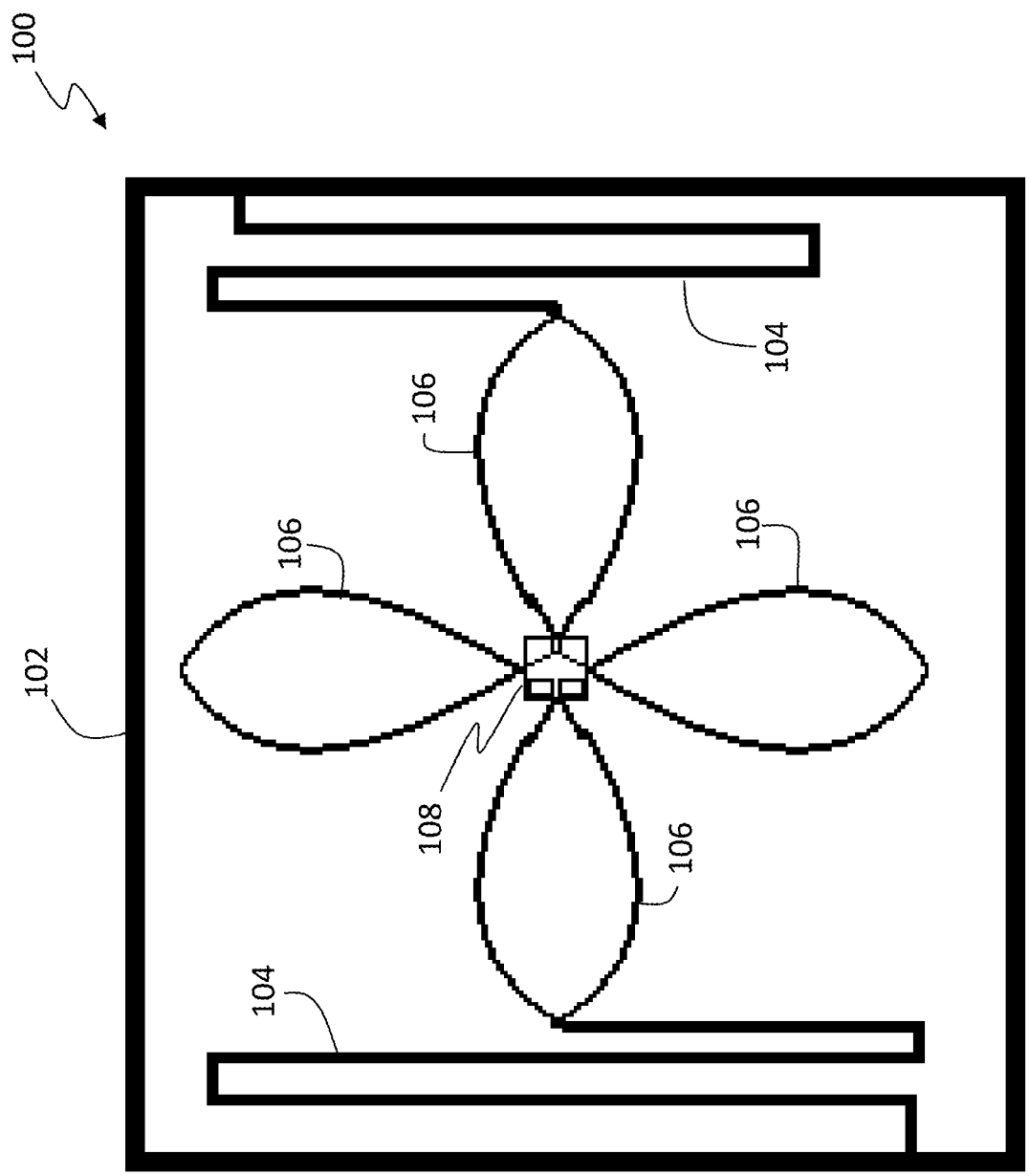
FIG. 1 depicts a schematic illustration of a sensor that may incorporate one or more embodiments of the present disclosure.

Referring now to FIG. 1, a schematic illustration of a sensor, such as a bolometer, that may employ one or more embodiments provided herein is shown. As shown, the sensor 100 includes a frame 102, holding arms 104, an antenna 106, and a platform 108. The platform 108 may be configured with various sensing elements, such as resistors and/or temperature sensors. In one non-limiting embodiment, the platform 108 may be configured with termination resistors of the antenna and a temperature sensor. As such, as shown in FIG. 1, a terahertz pixel sensor is shown, although other types of sensors may employ embodiments of the present disclosure.

Current silicon electronic circuits may not be able to detect high frequencies, such as in the terahertz range, and so detecting temperature changes within a thermometer device is one way to detect high frequency signals. The sensor 100, shown in FIG. 1, may be configured to detect such high frequency signals. For example, the sensor 100 may be configured having the antenna 106 as a broadband antenna that receives incoming terahertz energy or waves. The energy received by the antenna 106 is concentrated inside a load resistor within the platform 108. The energy heats up a thermal sensor or detector, such as a thermometer device, which is used to sense the temperature change of the platform 108. The thermal energy or temperature change can be used to indirectly measure the high frequency signal. The temperature change detected at the platform 108 is transmitted through the holding arms 104 to one or more electronic devices (not shown) that are configured to process the detected signal and convert the thermal energy into a measurement of the high frequency signal. The electronic devices may be a processor or other computing device configured to receive thermal energy as an input and can convert such information into a measurement of an amplitude of a signal detected by the antenna 106.

The temperatures changes within the sensor 100 that are used to detect a high frequency signal may be very small and/or sensitive. As such, the sensor 100 should be configured with very high or efficient thermal insulation to prevent any thermal energy loss as the information is conveyed from the platform to the external electronic devices.

In accordance with some embodiments, a microelectromechanical systems ("MEMS") process may be used for "trapping" the heat in the sensor 100. In some embodiments, during construction of the sensor 100, all silicon may be removed (e.g., by an etching process) except for the structure of the antenna 106, the platform 108, the holding arms 104, and/or the frame 102. These components may be electrically and/or thermally connected to a chip or other structure. Further, as will be appreciated by those of skill in the art, the sensor 100 may be configured as a single sensor among many sensors, such as a plurality of terahertz pixel sensors formed and configured on a single chip.

The holding arms 104 may be configured to provide mechanical support to the antenna 106 and the platform 108. For example, the holding arms 104 may provide the only physical connection between (i) the antenna 106 and platform 108 and (ii) the frame 102. The holding arms 104 may be configured to achieve a very high thermal insulation, proportional to the sensitivity, such that very little thermal loss may occur when a thermal signal is transmitted from the platform 108 through the holding arms 104. Further, within the thermal insulation may be electrical conductors to connect the platform 108 and antenna 106 to the electronic devices (not shown).

Because the sensor 100 must be configured to be sensitive to thermal changes, a number of considerations are made when forming the sensor. For example, optimizing the thermal resistance may have a negative impact on an electrical signal passing through the holding arms 104. A high thermal resistance may be used for large sensor sensitivity, resulting in narrow and long holding arms (as shown in FIG. 1 with bends to extend the length of the arms 104) made of a conductor having a protective layer, such as a silicon conductor within a protective oxide coating. Further, it may be desirable to have a low electrical resistance, which may tend to encourage wide and short holding arms made of metal. Furthermore, a high mechanical stability may be desired to provide support and structure to the other components, which may tend to encourage short, wide arms. Thus, the desired thermal properties may tend to have holding arms with opposite structure than as may be desired for electrical resistance and/or mechanical stability.

In some sensors, the holding arms may be configured as narrow, long arms made of a conductor, such as poly-silicon or crystalline-silicon, contained within a protective coating, such as an oxide coating. The long arms may also have a very narrow width, relative to the length, e.g., width to length=1:1000. To implement such long holding arms in a limited area defined by the frame of the sensor and accounting for the space occupied by the antenna and platform, the holding arms may be implemented with folds or bends, which may reduce the mechanical stability and support provided by the holding arms (e.g., as shown in FIG. 1). The conductor may be formed as a uniform structure having a constant width and height along the length thereof.

As described herein, holding arms for sensors, such as that shown and described above, may be provided that may improve the mechanical properties of the holding arm while maintaining optimized thermal and electrical resistance properties.

Figure 2B:
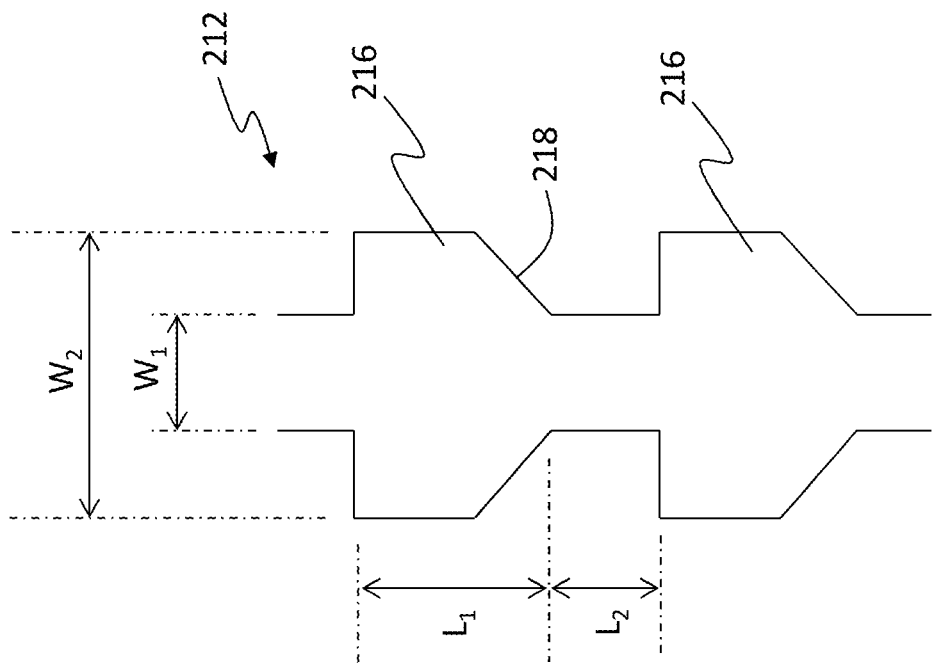
FIG. 2B is a detailed schematic illustration of a conductor of the holding arm of FIG. 2A.
Figure 2A:
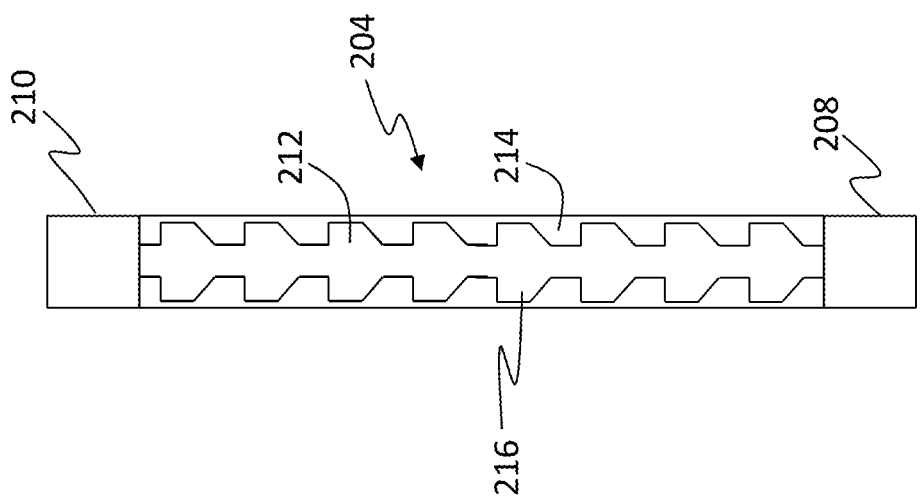
FIG. 2A is a schematic illustration of a holding arm of a sensor in accordance with an embodiment of the present disclosure.

For example, turning to FIGS. 2A and 2B, schematic illustrations of a holding arm 204 are shown. The holding arm 204 operatively connects a platform 208 with an electronic device 210. The electronic device 210 may be configured to process signals transmitted from the platform 208 along the holding arm 204. As shown in FIG. 2A, the holding arm 204 includes a conductor 212 within a protective coating 214. In some embodiments, the conductor 212 may be formed from silicon, poly-silicon, crystalline silicon or other conductive material. The protective coating 214, in some embodiments, may be an oxide coating that protects the conductor 212. The conductor 212 may be formed with disturbance elements 216, which in some embodiments may be formed in a periodic pattern along the length (i.e., extending from the platform 208 to the electronic device 210) of the holding arm 204. In accordance with some embodiments, the disturbance elements 216 may be configured to increase a thermal resistance due to phonon scattering within the conductor 212 at the location of the disturbance elements 216.

As shown in FIG. 2B, a detailed schematic illustration of the disturbance elements 216 is shown with the protective coating 214 surrounding the conductor 212 omitted for clarity. The disturbance element 216 may be configured with respect to a first width $W_1$. The first width $W_1$ may be a predefined minimum width of the conductor 212 of the holding arm 204 that enables proper thermal and electrical transmission for a sensor to accurately detect a signal received at the sensor. In some embodiments, the first width $W_1$ may be controlled or determined by design rules of CMOS processing in which the sensor is to be implemented. The disturbance elements 216 may be configured with a second width $W_2$ that is wider than the first width $W_1$, as shown in FIG. 2B. The increased width of the second width $W_2$ may provide a volume or disturbance which may enable phonon scattering within the disturbance element 216.

As noted, the disturbance elements 216 may be configured in a periodic manner. For example, the disturbance element 216 may have a first length $L_1$ that is a length of the disturbance element 216 in the length direction of the holding arm 204. Located between two disturbance elements 216 along the length of the holding arm 204 may be sections of the conductor 212 having the first width $W_1$. Thus, a periodic pattern may be formed with the conductor 212.

The disturbance elements 216 along the conductor 212 may have a minimal or even a positive effect on the electrical resistance of the conductor 212 while increasing thermal resistance due to phonon scattering at or within the disturbance elements 216. Further, the mechanical properties of the holding arm 204 may increase due to the structural integrity imparted by the portions of the conductor 212 that are wider or thicker (e.g., having second width $W_2$). As will be appreciated by those of skill in the art, to accommodate the second width $W_2$ the protective coating 214 must also be wider (e.g., as compared to a uniform length conductor and coating), such that the overall strength and structure of the holding arm 204 is increased.

As shown in FIGS. 2A and 2B, the disturbance elements 216 may include variable widths, expanding from the first width $W_1$ to the second width $W_2$. For example, the disturbance elements 216 may include tapered portions 218 that gradually increase the width of the disturbance elements 216 from the first width $W_1$ to the second width $W_2$. In the embodiment of FIGS. 2A and 2B, the tapered portions 218 may enable directional thermal conductivity, with lower thermal conductivity in one direction compared to another direction. For example, it may be advantageous to have a higher thermal resistance in a direction flowing from the platform 208 to the electronic device 210 as compared to contra thermal energy flow. That is, due to the asymmetry of the disturbance elements 216, the thermal conductivity within the holding arm 204 may become direction dependent.

As will be appreciated by those of skill in the art, the disturbance elements may take various geometries and/or shapes. For example, in some configurations, the disturbance elements may not include the tapered portion, or the entire structure of the holding arm may be changed. Various alternative, non-limiting configurations will now be described.

Figure 3:
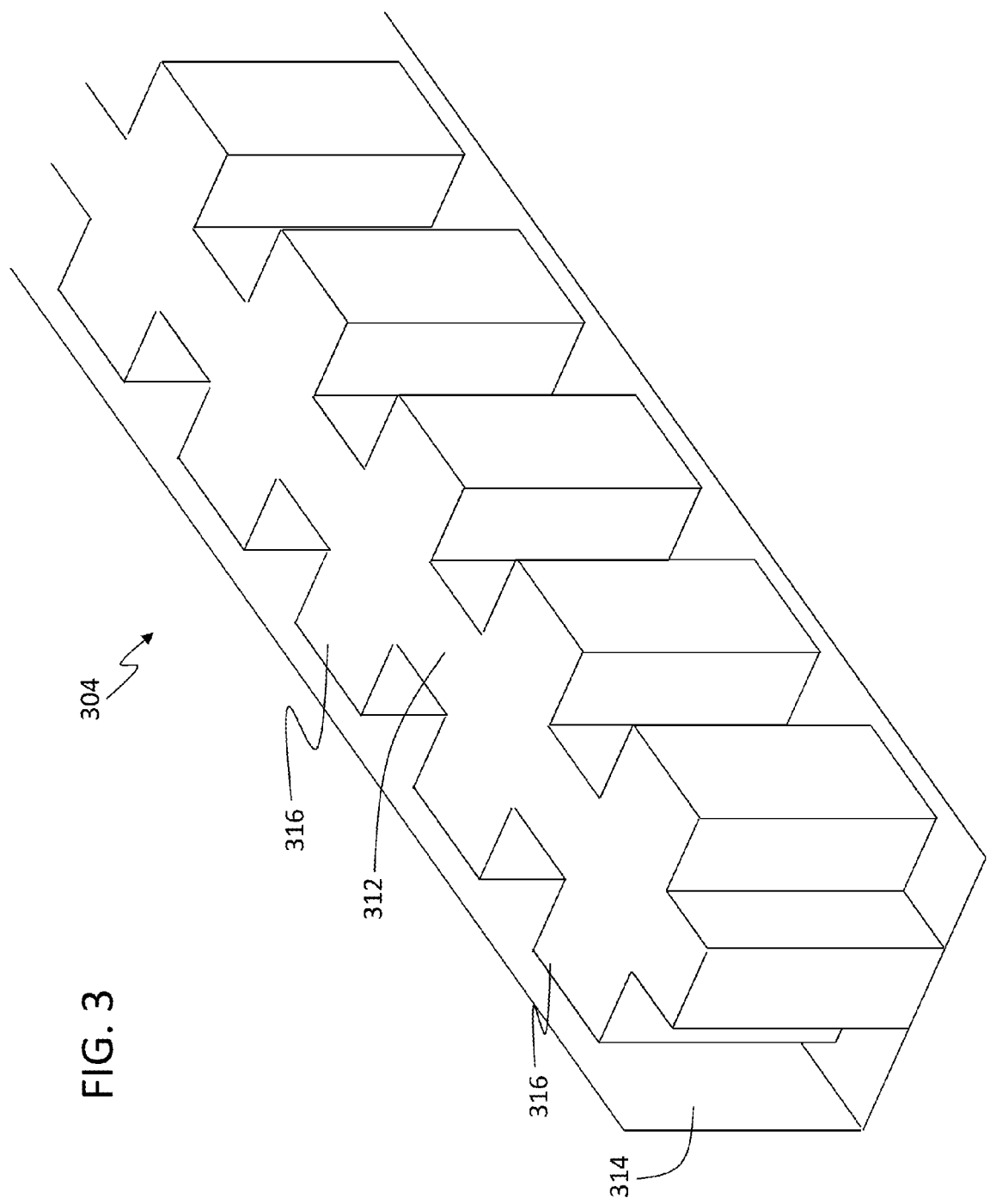
FIG. 3 is a perspective schematic illustration of a holding arm in accordance with another embodiment of the present disclosure.

Turning to FIG. 3, an alternative configuration of a holding arm 304 is shown. Similar to the embodiment shown in FIGS. 2A and 2B, the holding arm 304 may be formed from a conductor 312 that is coated with a protective coating 314 (shown partially cut-away for clarity). The conductor 312 may include a plurality of disturbance elements 316 positioned along a length of the conductor 312. Similar to the holding arm 204 of FIGS. 2A and 2B, the holding arm 304 may have a first width that is a predefined minimum width of the conductor 312 and the disturbance elements 216 may be configured with second widths that are larger than the first width. In the embodiment of FIG. 3, the disturbance elements 316 are configured with no tapering portion, but rather the transition from the first width to the second width is abrupt. As shown, the profile or shape of the disturbance elements 316 is square or rectangular. Those of skill in the art will appreciate that other geometries may be used without departing from the scope of the present disclosure.

Figure 4:
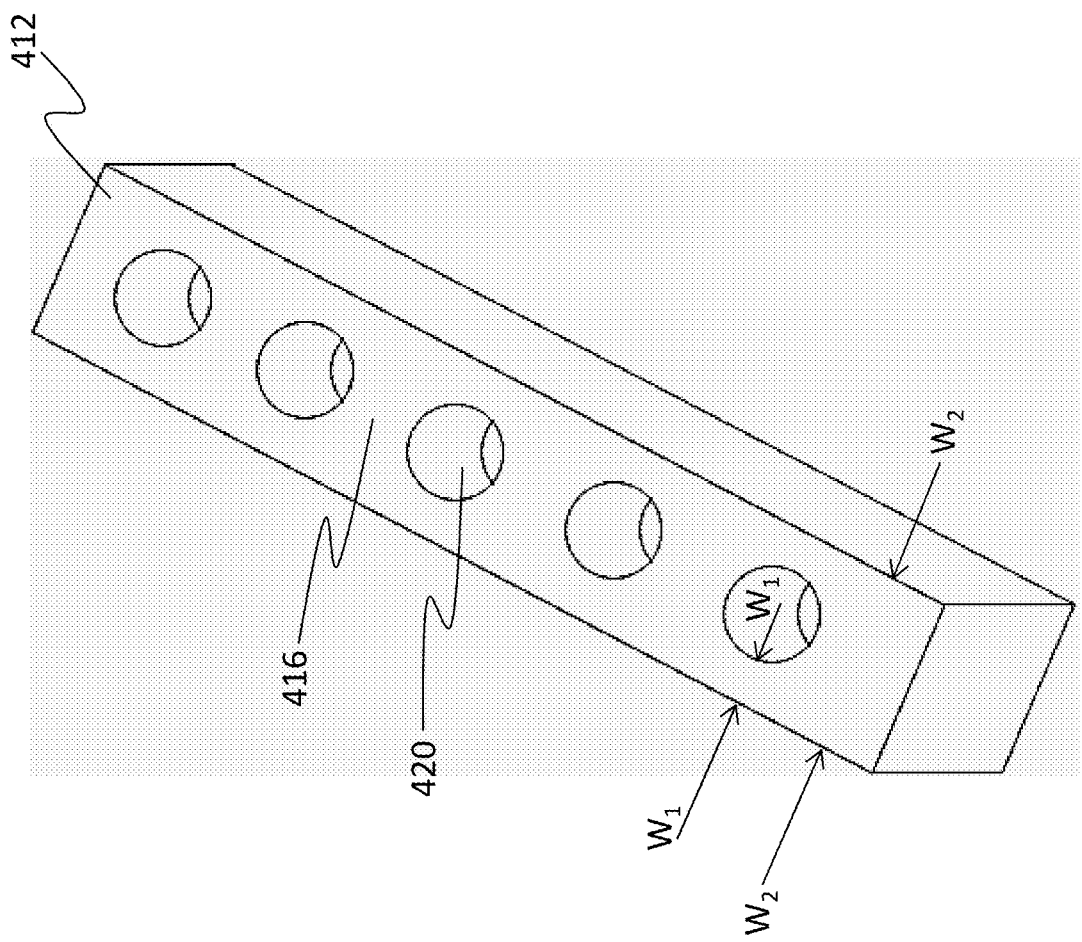
FIG. 4 is a perspective schematic illustration of a holding arm in accordance with another embodiment of the present disclosure.

Turning now to FIG. 4 an alternative configuration of a conductor 412 of a holding arm in accordance with a non-limiting embodiment of the present disclosure is shown. In the embodiment of FIG. 4, a protective coating that may surround and protect the conductor 412 is not shown for simplicity, although those of skill in the art will appreciate that the conductor 412 may be coated with a protective coating as described above.

In FIG. 4, the disturbance elements 416 are configured in a different fashion than that described above. For example, as shown in FIG. 4, the conductor 412 has a structure with periodic holes 420. In this embodiment, the minimum width of the conductor 412 is shown as a first width $W_1$. The first width $W_1$ may be similar in structure and function as first width $W_1$ described above with respect to FIG. 2B. Similarly, a second width $W_2$ is shown in the conductor 412 of FIG. 4. The disturbance elements 416 are configured as having the second width $W_2$, and the combination of the holes 420 and the disturbance elements 416 enable an increased thermal resistance due to phonon scattering within the conductor 412 at the location of the disturbance elements 416 as the phonons travel within the conductor 412 and interact with the holes 420.

As will be appreciated by those of skill in the art, during the coating process when a protective coating layer is applied, the coating material may fill in the holes 420. That is, all surfaces of the conductor 412, including the surfaces of the holes passing through the conductor 412, may be coated with a protective coating, such as an oxide coating. A holding arm with a conductor 412 configured as shown in FIG. 4, may have improved torsion strength in the holding arm. Further, the holes 420 at the interface between the disturbance elements 416 and the first width $W_1$ portions of the conductor 412 may improve the thermal properties due to phonon scattering at the interface. As shown, the conductor 412 forms a linear, one-dimensional conductor, such that the holes 420 may be linearly aligned along a length of the conductor 412, and enables the phonon scattering.

Figure 7:
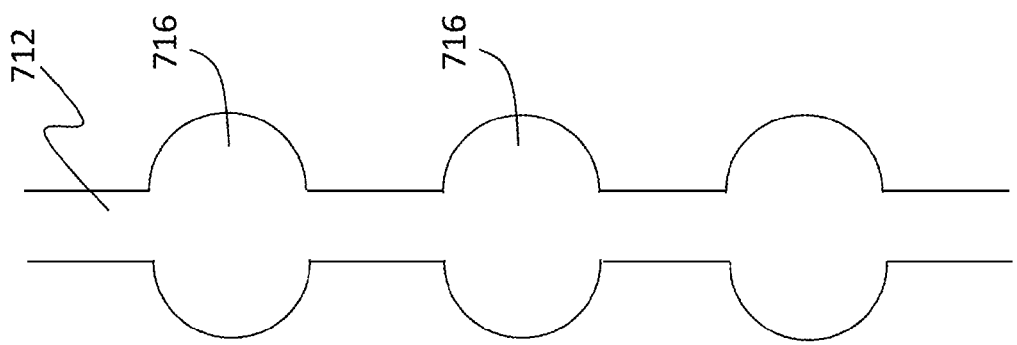
FIG. 7 is a plan schematic illustration of a conductor in accordance with another embodiment of the present disclosure.
Figure 6:
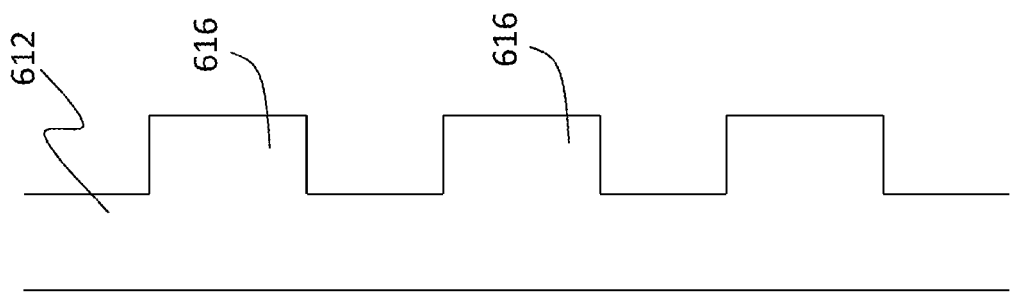
FIG. 6 is a plan schematic illustration of a conductor in accordance with another embodiment of the present disclosure.
Figure 5:
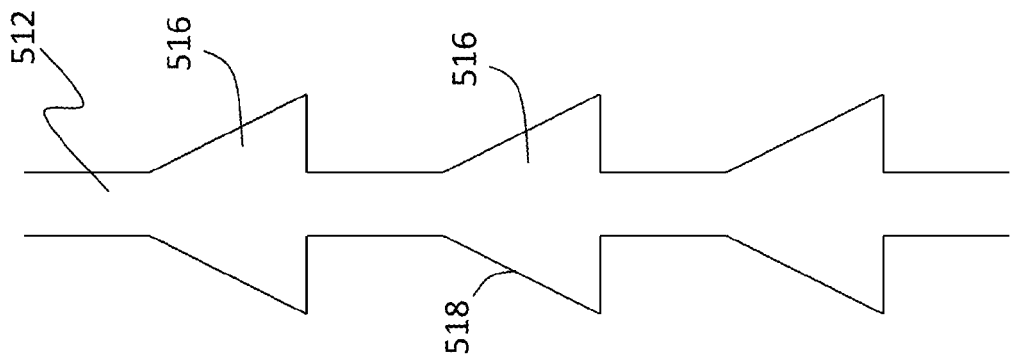
FIG. 5 is a plan schematic illustration of a conductor in accordance with an embodiment of the present disclosure.

Turning now to FIGS. 5-7, various alternative geometries of disturbance elements on conductors for holding arms in accordance with non-limiting embodiments of the present disclosure are shown. In each of the embodiments shown, the illustrations are plan view, top-down schematics showing the geometry of the disturbance elements. Further, a protective coating is omitted for clarity. In FIG. 5, the disturbance elements 516 are formed along a length of the conductor 512, with each disturbance element 516 having a tapered portion 518. As shown in FIG. 5, as compared to the embodiment shown in FIGS. 2A and 2B, the tapered portion 518 forms the entire axial length of the disturbance element 516, with an abrupt transition at one end of the disturbance element 516.

In FIG. 6, it is shown that the disturbance elements 616 may be asymmetrical with respect to an axis of the conductor 612. In FIG. 7, it is shown that the disturbance elements 718 may have curved surfaces and/or geometry. As will be appreciated by those of skill in the art various other geometries, shapes, sizes, etc. may be employed when forming disturbance elements in a conductor of a holding arm, without departing from the scope of the present disclosure. Further, some configurations (e.g., FIGS. 2A, 2B, 5) may be configured with directional dependency of thermal properties Turning now to FIG. 8, another alternative configuration of a conductor 812 within a protective coating 814 of a holding arm 804 in accordance with the present disclosure is shown. The conductor 812 shown in FIG. 8 is formed with a structure having phonon reflecting silicon-metal interfaces. The conductor 812 includes a repeating pattern having a first conductor element 822, a connector 824, and a second conductor element 826 operatively connective to the first conductor element 822 via the connector 824. The first conductor element 822 may form a base of the conductor 812 and, in some embodiments, may be formed of a poly-silicon. The connector may be a highly conductive material such as Tungsten. The second conductor element 826 may be a metal, such as copper. Alternatively, the first and second conductor elements 822, 826 may be formed from silicon with a connector therebetween, and in such embodiments, the phonon scattering of the disturbance elements may occur at the conductor element-connector interface.

The structure of the first and second conductor elements 822, 826 connected by connector 824 may form a disturbance element within the conductor 812. For example, the interface between the first and second conductor elements 822, 826 with connector 824 may provide lowered thermal conductivity due to phonon scattering at the interface. Although shown as a linear connection, with the first conductor element 822 and the second conductor element 826 oriented along an axis of the conductor 812 or the holding arm, those of skill in the art will appreciate that other configurations are possible, such as one of the two conductor elements 822, 826 may be configured perpendicular to the other of the two conductor elements 822, 826.

Figure 9:
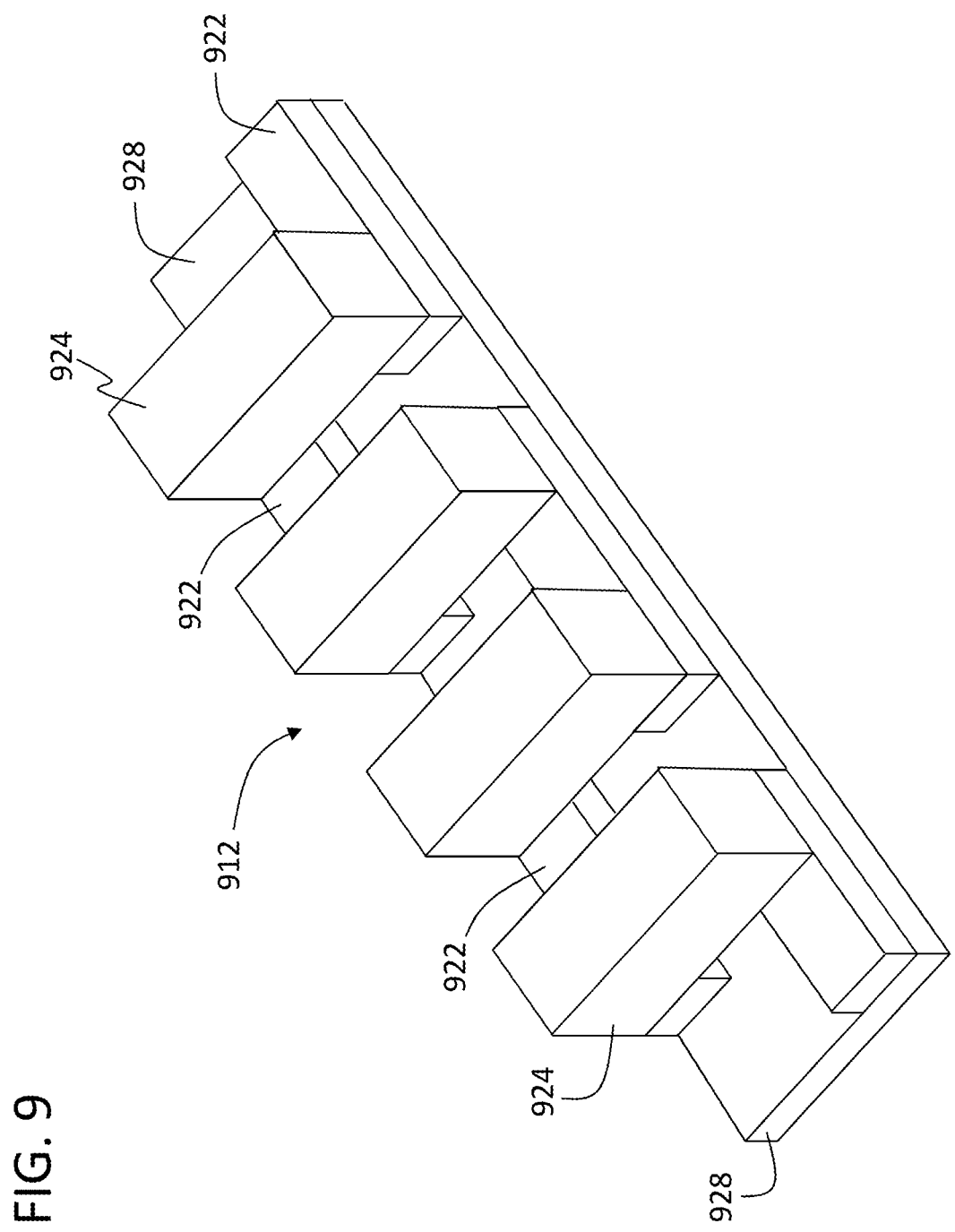
FIG. 9 is a perspective schematic illustration of a conductor in accordance with another embodiment of the present disclosure.
Figure 10:
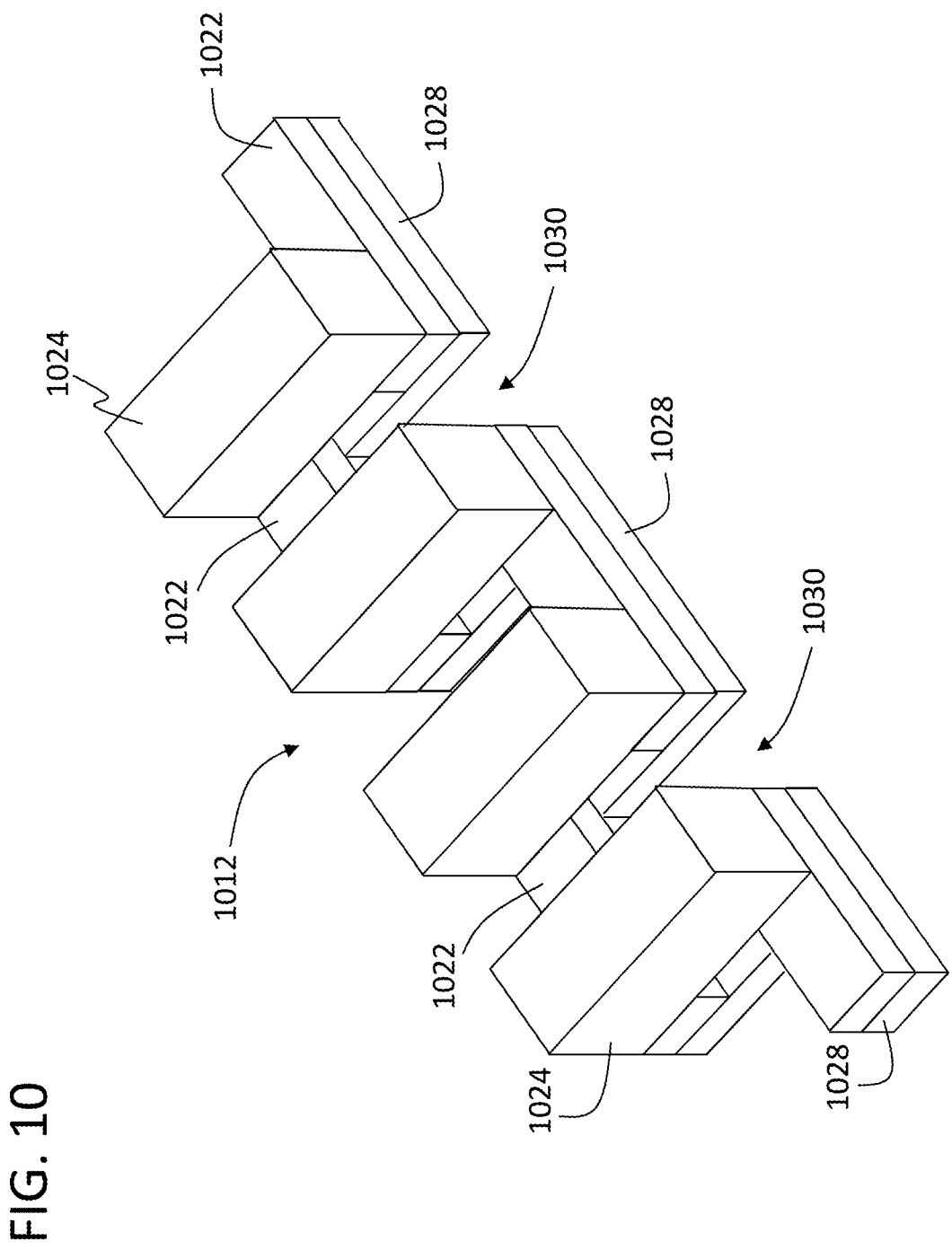
FIG. 10 is a perspective schematic illustration of a conductor in accordance with another embodiment of the present disclosure.

Turning now to FIGS. 9 and 10, alternative configurations of conductors for holding arms in accordance with embodiments of the present disclosure are shown. In both FIGS. 9 and 10, a protective coating feature is omitted for clarity. The structure of the conductors 912, 1012 of FIGS. 9 and 10 may be formed similar to that shown in FIG. 8, but with only one conductor element. That is, as shown in FIG. 9, an optional base 928 may form a support or substrate upon which the conductor 912 is formed. The optional base 928 may be formed of a material such as an oxide or other material, and in some embodiments, the base may be formed from the same material as and/or as part of the protective coating that is applied to and protects the conductor 912, 1012.

The conductor 912 may include a plurality of conductor elements 922 which may be aligned axial to form the conductor 912 along the optional base 928, with each conductor element 922 offset from an adjacent conductor element 922. As shown, a connector 924 is configured to operatively connect two adjacent conductor elements 922 and thus form the conductor 912.

In the embodiment of FIG. 10, the conductor 1012 is formed and constructed similar to that shown in FIG. 9, with an optional base 1028 forming a base or substrate upon which the conductor 1012 is formed. The conductor 1012 includes a plurality of conductor elements 1022 which may be aligned axial to form the conductor 1012, with each conductor element 1022 offset from an adjacent conductor element 1022. As shown, a connector 1024 is configured to operatively connect two adjacent conductor elements 1022 and thus form the conductor 1012. The primary difference between the conductor 912 of FIG. 9 and the conductor 1012 of FIG. 10 is that the optional base 1028 in FIG. 10 is only present under the conductor elements 1022 and the connectors 1024, with gaps 1030 formed within the optional base 1028. In some embodiments, the gaps 1030 may be formed by etching the base and/or protective coating.

Figure 11:
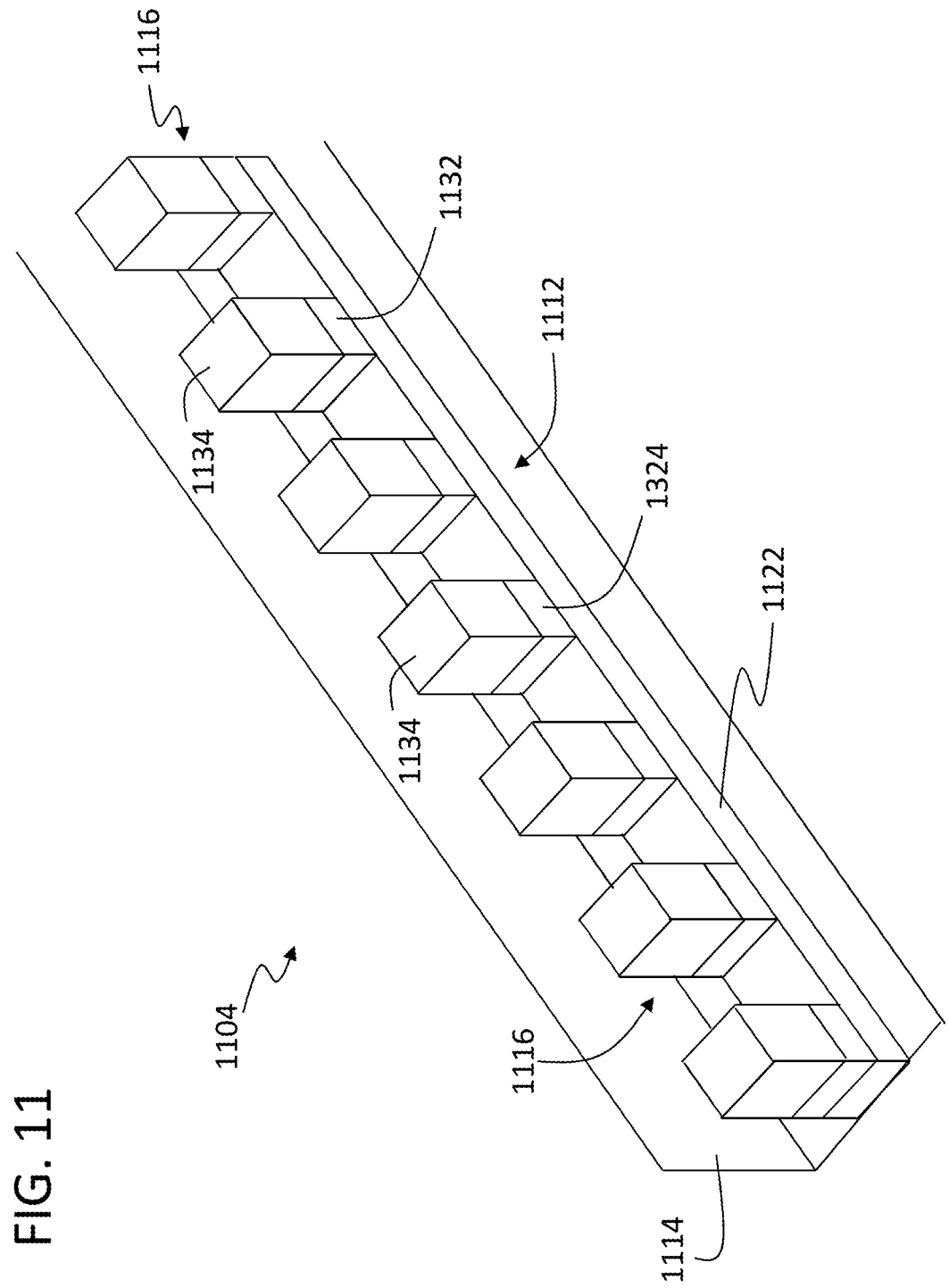
FIG. 11 is a perspective schematic illustration of a holding arm in accordance with another embodiment of the present disclosure.

Turning now to FIG. 11, another alternative configuration of a conductor 1112 for a holding arm in accordance with the present disclosure is shown. In this embodiment, a protective coating 1114 is shown surrounding and protecting the conductor 1112. A conductor element 1122 is formed as a single, continuous conductor element 1122, extending an axial length of a holding arm 1104. In this embodiment, a number of disturbance elements 1116 are formed along the length of the conductor element 1122. Each disturbance element 1116 includes a first component 1132 and a second component 1134. The first component 1132 of the disturbance element 1116 may be an MOS transistor's gate oxide or other device configured to form an interface between the conductor element 1122 and the second component 1134 of the disturbance element 1116. In some configurations, the first component 1132 of the disturbance element 1116 may be an oxide gate and the second component 1134 of the disturbance element 1116 may be formed of poly silicon (e.g., gate material in a CMOS process).

Figure 12:
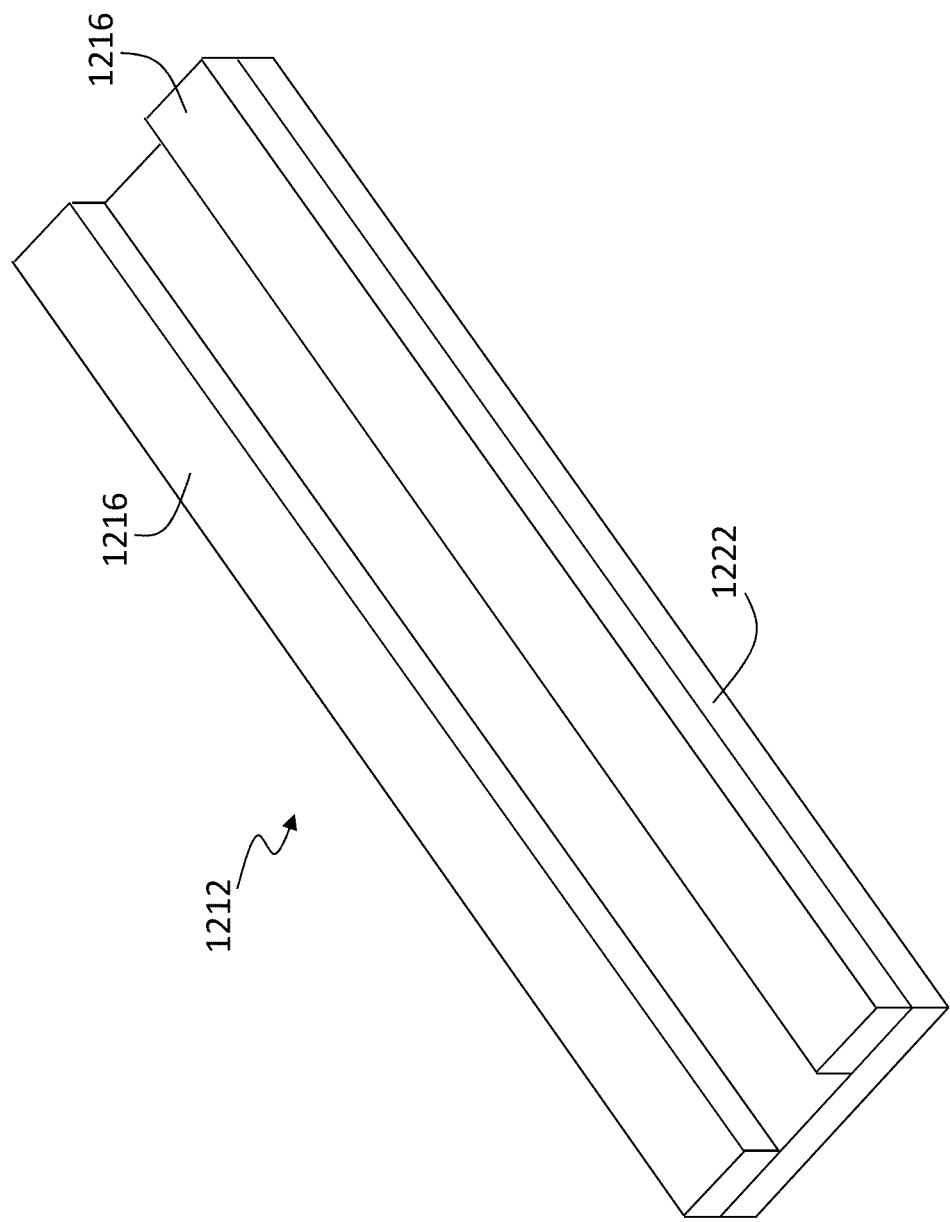
FIG. 12 is a perspective schematic illustration of a conductor in accordance with another embodiment of the present disclosure.

Turning now to FIG. 12, another alternative configuration of a conductor 1212 for a holding arm in accordance with the present disclosure is shown. In this embodiment, a protective coating is omitted for clarity. A conductor element 1222 is formed as a single, continuous conductor element 1222, extending an axial length of a holding arm. In this embodiment, two disturbance elements 1216 are formed along the length of the conductor element 1222. Each disturbance element 1216 may be a continuous structure that attaches to or contacts a portion of a surface of the conductor element 1222. As shown, the two disturbance elements 1216 are configured on a single surface of the conductor element 1222 and are separated from each other. Further, as shown, the combination of the two disturbance elements 1216 and the conductor element 1222 for a U-shaped structure. In some embodiments, the conductor element 1222 may be formed of a crystalline silicon and the two disturbance elements 1216 may be formed of poly-silicon. The structure of the conductor 1212 may provide improved structural and/or mechanical properties to a holding arm in which the conductor 1212 is located.

As provided herein, various embodiments of a holding arm for a sensor have been provided. The conductor within the holding arm of the sensor may be formed with a plurality of periodic disturbance elements that are positioned and/or configured along the length of the holding arm. As described above, the disturbance elements may be formed by increased widths in the material of the conductor itself (e.g., FIGS. 2A-7), may be formed by interfaces between various conductor elements (e.g., FIGS. 8-10), and/or may be formed by attaching a disturbance element to a surface of the conductor (e.g., FIG. 11-12). As will be appreciated by those of skill in the art, the above configurations are provided for example and illustrative purposes only and other configurations of disturbance elements may be formed and used within a holding arm without departing from the scope of the present disclosure. As will be appreciated by those of skill in the art, the base and/or protective coating may be omitted and/or optional, and thus is not a required component or feature of the embodiments described herein.

Technical effects and benefits include forming a disturbance element or feature within and/or along a conductor of a holding arm in a sensor that provides improved thermal, electrical, and/or mechanical properties to the holding arm of the sensor. In some embodiments, technical effects include introducing a phonon scattering feature into the conductor such that thermal resistance increases along the length of the conductor of the holding arm.

Further, in accordance with some embodiments provided herein, the disturbance elements may have minimal or even positive effects on the electrical resistance while also increasing thermal resistance due to phonon scattering within the conductor. Moreover, mechanical and/or structural properties of the conductor, and thus the holding arms of the sensors, may be improved. Furthermore, in accordance with some embodiments provided herein, thermal conductivity may be made directional, providing additional benefits to the conductors and holding arms of sensors as described herein. Additional benefits of various embodiments provided herein may include improved torsion strength of the holding arm. Additionally, longer holding arms than made with a single, straight silicon arm may be enabled by embodiments provided herein, which may further improve thermal resistance within the sensor.

Moreover, various embodiments provided herein may improve sensor sensitivity by introducing disturbance elements or features within the holding arm of the sensor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A sensor for detecting an incident signal, the sensor comprising:
    a frame;
    an antenna and a platform configured to detect the incident signal; and
    a holding arm connected to the frame, the holding arm configured to structurally support the antenna and the platform, and further configured to operably connect the platform to an electronic device external to the frame, wherein the holding arm includes a conductor having an axial length and a plurality of disturbance elements formed along the axial length of the conductor,
    wherein:
        the axial length of the conductor extends through the protective coating, and
        the plurality of disturbance elements are formed as periodically changing structural features along the axial length of the conductor.

2. The sensor of claim 1, wherein a first portion of the conductor defines a first width and each disturbance element of the plurality of disturbance elements comprises a second width, wherein the second width is larger than the first width and the first portion is disposed adjacent to one or more disturbance elements.

3. The sensor of claim 2, wherein the disturbance element comprises a tapered portion extending from the second width to the first width.

4. The sensor of claim 1, wherein the antenna is configured to receive high frequency signals and the platform is configured to convert the high frequency signal received at the antenna into an electrical signal to be transmitted along the conductor of the holding arm.

5. The sensor of claim 1, wherein the disturbance elements are configured to generate phonon scattering to increase a thermal resistance within the conductor.

6. The sensor of claim 1, wherein the conductor has a plurality of holes passing through the conductor in a direction perpendicular to the axial length, wherein the disturbance elements are formed of sections of the conductor that do not include one of the plurality of holes.

7. The sensor of claim 1, wherein the conductor is formed from a plurality of conductor elements and a plurality of connectors operatively connecting one conductor element with an adjacent conductor element.

8. The sensor of claim 7, wherein the connector is configured extending in a direction perpendicular to the axial length.

9. The sensor of claim 7, wherein the plurality of conductor elements include a plurality of first conductor elements and a plurality of second conductor elements, wherein one connector operatively connects a first conductor element to a second conductor element.

10. The sensor of claim 1, wherein the plurality of disturbance elements are configured such that a thermal conductance along the axial length of the conductor is directional.

11. A method of making a holding arm of a sensor for detecting an incident signal, the sensor having a frame, an antenna, and a platform, the holding arm configured to support the platform and the antenna within the frame and configured to operably connect the platform to an electronic device external to the frame, the method of making the holding harm comprising:
    forming a conductor having an axial length; and
    forming a plurality of disturbance elements along the axial length of the conductor,
    wherein:
        the method further comprises coating the conductor with a protective coating,
        the axial length of the conductor extends through the protective coating, and
        the forming of the plurality of disturbance elements comprises forming the plurality of the disturbance elements as periodically changing structural features along the axial length of the conductor.

12. The method of claim 11, wherein a first portion of the conductor defines a first width and each disturbance element of the plurality of disturbance elements comprises a second width, wherein the second width is larger than the first width and the first portion is disposed adjacent to one or more disturbance elements.

13. The method of claim 12, wherein the disturbance element comprises a tapered portion extending from the second width to the first width.

14. The method of claim 11, wherein the disturbance elements are configured to generate phonon scattering to increase a thermal resistance within the conductor.

15. The method of claim 11, wherein the conductor has a plurality of holes passing through the conductor in a direction perpendicular to the axial length, wherein the disturbance elements are formed of sections of the conductor that do not include one of the plurality of holes.

16. The method of claim 11, wherein the conductor is formed from a plurality of conductor elements and a plurality of connectors operatively connecting one conductor element with an adjacent conductor element along the axial length.

17. The method of claim 16, wherein the plurality of conductor elements include a plurality of first conductor elements and a plurality of second conductor elements, wherein one connector operatively connects a first conductor element to a second conductor element.

18. The method of claim 11, wherein the plurality of disturbance elements are configured such that a thermal conductance along the axial length of the conductor is directional.

\* \* \* \* \*